(12) United States Patent
Nishina et al.

(10) Patent No.: US 7,618,593 B2
(45) Date of Patent: Nov. 17, 2009

(54) REDUCING AGENT CONTAINER HAVING NOVEL STRUCTURE

(75) Inventors: Mitsuhiro Nishina, Ageo (JP); Hideki Matsunaga, Ageo (JP); Shinichi Inoue, Ageo (JP); Toshimi Nakamura, Ageo (JP)

(73) Assignees: Nissan Diesel Motor Co., Ltd., Saitama (JP); Mitsui Mining & Smelting Co., Ltd., Tokyo (JP)

(*) Notice: Subject to any disclaimer, the term of this patent is extended or adjusted under 35 U.S.C. 154(b) by 257 days.

(21) Appl. No.: 11/790,750

(22) Filed: Apr. 27, 2007

(65) Prior Publication Data

US 2007/0202019 A1    Aug. 30, 2007

Related U.S. Application Data

(63) Continuation of application No. PCT/JP2005/017129, filed on Sep. 16, 2005.

(30) Foreign Application Priority Data

Oct. 29, 2004    (JP)    ............... 2004-315574

(51) Int. Cl.
*C06B 21/00*    (2006.01)

(52) U.S. Cl. ............ 422/102; 422/63; 422/99; 73/1.73; 73/447; 73/747

(58) Field of Classification Search ............ 433/239.1, 433/212, 235; 137/88, 297; 75/259, 361, 75/443; 266/81

See application file for complete search history.

(56) References Cited

U.S. PATENT DOCUMENTS

2007/0075467 A1* 4/2007 Osaku et al. ............ 266/81

FOREIGN PATENT DOCUMENTS

| JP | 05-222923 | 8/1993 |
| JP | 2000-27627 | 1/2000 |
| JP | 2002-527660 | 8/2002 |
| JP | 2003-529011 | 9/2003 |
| JP | 2004-257325 | 9/2004 |
| WO | WO 03/018177 | 3/2003 |

* cited by examiner

*Primary Examiner*—Jill Warden
*Assistant Examiner*—Dwan A Gerido
(74) *Attorney, Agent, or Firm*—Baker & Hostetler LLP (57) ABSTRACT

On an upper surface of a container body, there are disposed at least a base portion of a concentration meter configured to detect the concentration of a liquid reducing agent based on a heat transmission characteristic between two spaced points, and a heat exchanger configured to permit the engine coolant to circulate therein and arranged to surround a detecting section of the concentration meter, which hangs from the base portion of the concentration meter via a supporting column thereof, to thereby perform the heat exchange with the liquid reducing agent, and also, a protector or an encasing element of substantially box shape is arranged to surround a lower portion of the heat exchanger and the detecting section of the concentration meter, and further, a visor is attached on the supporting column of the concentration meter, which is positioned above the protector by a predetermined interval.

6 Claims, 9 Drawing Sheets

REDUCING AGENT CONTAINER HAVING NOVEL STRUCTURE

This application is a continuation of PCT/JP2005/017129, filed on Sep. 16, 2005.

BACKGROUND OF THE INVENTION

1. Field of the Invention

The present invention relates generally to an exhaust emission purifying apparatus for reductively purifying nitrogen oxides ($NO_x$), and in particular, to a technology for increasing a detection accuracy of a concentration meter which is configured to detect the concentration of a liquid reducing agent based on a heat transmission characteristic between two spaced points while accelerating the defrosting of the liquid reducing agent stored in a reducing agent container in the exhaust emission purifying apparatus for reductively purifying $NO_x$.

2. Description of the Related Art

Japanese Unexamined Patent Publication No. 2000-27627 discloses an exhaust emission purifying apparatus as one proposal for a catalytic converter purifying system for eliminating $NO_x$ contained in the exhaust gas from an engine. In such an exhaust emission purifying apparatus, a liquid reducing agent is injection-supplied to the exhaust emission stream in an upstream portion of a reduction catalytic converter disposed in an engine exhaust emission system, depending on engine operating conditions, so that $NO_x$ in the exhaust gas and the liquid reducing agent are subjected to the catalytic-reduction reaction, to thereby purify $NO_x$ into harmless components.

However, in a cold region, such as Hokkaido Island in Japan, sometimes in winter, the outside temperature falls down to or below a freezing point of a liquid reducing agent, and then, the liquid reducing agent stored in a reducing agent container can be frozen. The liquid reducing agent ordinarily begins to be frozen from a peripheral portion in the container which is in contact with the outside air, and the freezing thereof gradually progresses toward the liquid reducing agent in a container center portion. On a bottom portion of the reducing agent container, there are positioned a detecting section of a concentration meter configured to detect the concentration of the liquid reducing agent based on a heat transmission characteristic between two spaced points, a suction port configured to suck the liquid reducing agent therethrough and the like. Therefore, if the liquid reducing agent is frozen even in slightly, it becomes difficult to perform the detection of the concentration of the liquid reducing agent and the supply thereof. On the reducing agent container, there is mounted a heat exchanger which permits the engine coolant to circulate therein to perform the heat exchange with the liquid reducing agent. However, when a stopping of operation of an engine continues for a long time, since the coolant temperature is low immediately after starting of the engine operation, it necessarily takes a certain time period to defrost the frozen liquid reducing agent.

Therefore, to defrost the liquid reducing agent in a short time after the engine operation is started, it can be considered to provide with a box-like encasing member configured to trap therein the heat discharged from the heat exchanger, which encasing member is disposed around the suction port that sucks the liquid reducing agent and the detecting section of the concentration meter of the liquid reducing agent. However, there is a possibility of the following problem. Namely, if a space or a gap exists between the concentration meter and the encasing member, when the liquid reducing agent is replenished into the reducing agent container, bubbles may sometimes enter the inside of the encasing member together with the liquid reducing agent and adhere to the detecting section of the concentration meter. If bubbles adhere to the detecting section of the concentration meter, the heat transmission characteristic between the two spaced points is changed, resulting in significant degradation of the concentration detection accuracy of the concentration meter. Incidentally, since the concentration meter needs the periodic inspection and maintenance, it is impossible to couple the concentration meter with the encasing member without any space.

SUMMARY OF THE INVENTION

Therefore, in view of the above problems, the present invention has an object to provide a reducing agent container having a structure capable of preventing bubbles from entering into an encasing member which is indispensably provided for promoting the defrosting of a liquid reducing agent, to thereby increase the detection accuracy of a concentration meter while promoting the defrosting of the liquid reducing agent stored in the reducing agent container.

In order to achieve the above object, a reducing agent container having a novel structure, according to the present invention is provided with such a configuration that, on an upper surface of a container body, there are disposed a base portion of a concentration meter configured to detect the concentration of a liquid reducing agent based on a heat transmission characteristic between two spaced points, and a heat exchanger which is configured to permit a heating medium using an engine as a heat source thereof to circulate therein and arranged to surround a detecting section of the concentration meter which detecting section is suspended from the base portion of the concentration meter via a supporting column thereof, to thereby perform the heat exchange with the liquid reducing agent, and also, there is disposed an encasing member of substantially box shape arranged to surround a lower portion of the heat exchanger and the detecting section of the concentration meter, and further, there is disposed a visor attached to the supporting column of the concentration meter, at a position located above and spaced apart from the encasing member by a predetermined interval.

According to the reducing agent container having a novel structure, in accordance with the present invention, the heat discharged from the lower portion of the heat exchanger is trapped in the encasing member so as to generate the convection within a region of the encasing member. The concentration meter positioned in the encasing member and the liquid reducing agent around the concentration meter are efficiently defrosted, so that a concentration detection of the liquid reducing agent can be started in a short time after an engine operation is started. Further, when the liquid reducing agent is replenished, the liquid reducing agent is swashed by the visor attached on the supporting column of the concentration meter toward the circumference of the visor. Accordingly, it becomes rather hard for the liquid reducing agent to directly pass through a space between the supporting column and the encasing member to enter the inside of the encasing member upon the replenishment. Consequently, it also becomes hard for bubbles which may be entered the inside of the encasing member together with the liquid reducing agent, to adhere to the detecting section of the concentration meter. Therefore, it is possible to suppress the degradation of the concentration detection accuracy depending on a change in the heat transmission characteristic between the two spaced points. As a result, it is possible to improve the detection accuracy of the concentration meter which detects the concentration of the liquid reducing agent, while promoting the defrosting of the liquid reducing agent stored in the reducing agent container.

DESCRIPTION OF THE PREFERRED EMBODIMENTS

Hereunder, there will be described several embodiments of the present invention with reference to the accompanying drawings.

Figure 1:
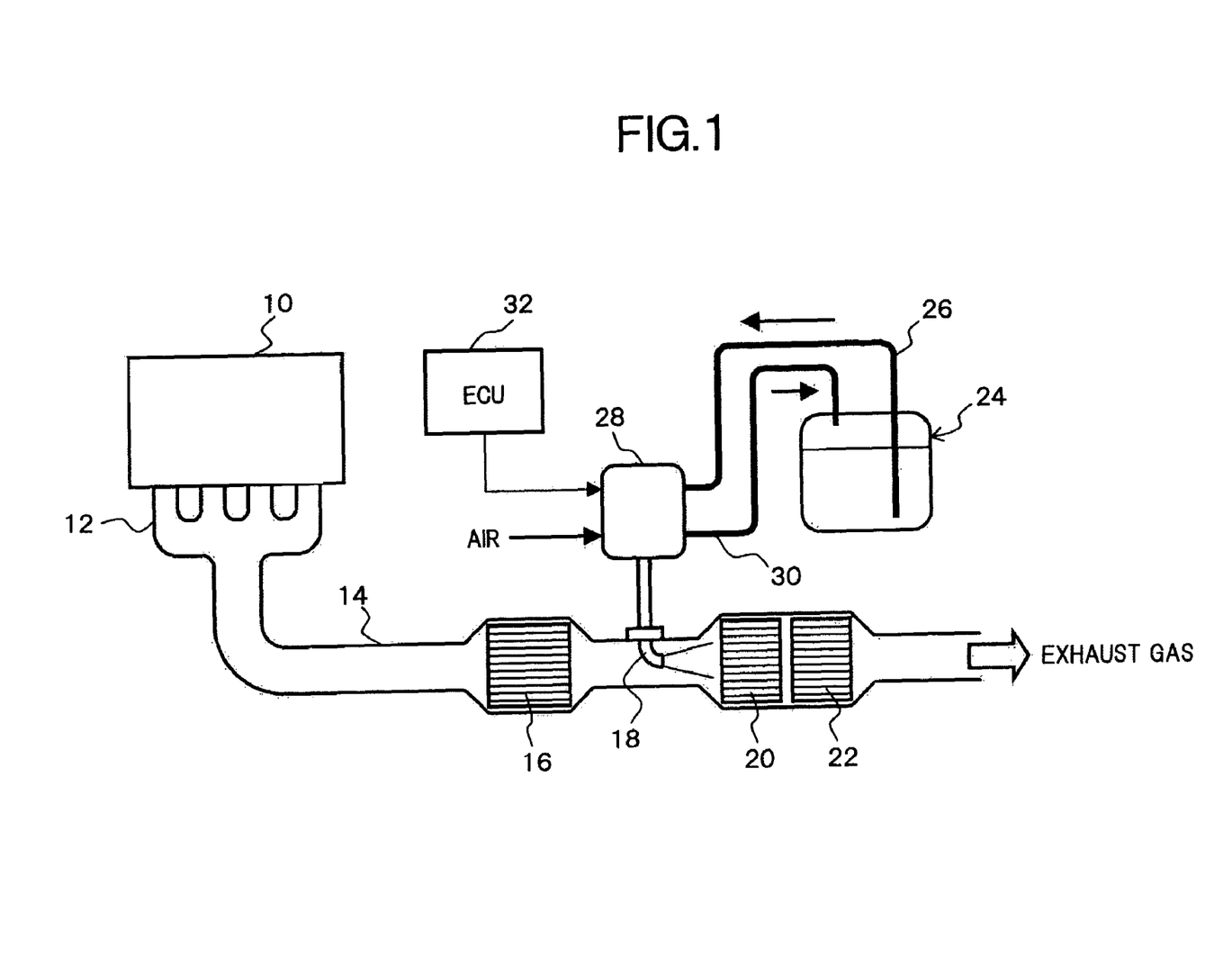
FIG. 1 is an overall configuration diagram of an exhaust emission purifying apparatus to which the present invention is to be applied.

FIG. 1 shows an overall configuration of an exhaust emission purifying apparatus for purifying $NO_x$ contained in the exhaust gas of an engine by the catalytic-reduction reaction, using the urea aqueous solution as a liquid reducing agent, and to this type of exhaust emission purifying apparatus, the present invention may be typically applied, as will be understood from the ensuing description.

In an exhaust pipe 14 connected to an exhaust manifold 12 of an engine 10, there are disposed respectively, along an exhaust gas flow direction, an oxidation catalytic converter 16 for oxidizing nitrogen monoxide (NO) into nitrogen dioxide ($NO_2$), an injection nozzle 18 for injection-supplying the urea aqueous solution, a $NO_x$ reduction catalytic converter 20 for reductively purifying $NO_x$ with ammonia obtained by hydrolyzing the urea aqueous solution, and an ammonia oxidation catalytic converter 22 for oxidizing ammonia passed through the $NO_x$ reduction catalytic converter 20. Further, the urea aqueous solution stored in a reducing agent container 24 is supplied to a reducing agent supply device 28 via supply piping 26 of which suction port is positioned on a bottom portion of the reducing agent container 24, while the surplus urea aqueous solution which did not contribute to the injection in the reducing agent supply device 28 being returned into an upper space of the reducing agent container 24 via return piping 30. Then, the reducing agent supply device 28 is controlled by a control unit 32 incorporating therein an electronic computer, to supply the urea aqueous solution according to engine operating conditions to the injection nozzle 18 while mixing the urea aqueous solution with air.

In such an exhaust emission purifying apparatus, the urea aqueous solution injection-supplied from the injection nozzle 18 is hydrolyzed with the exhaust heat and the water vapor in the exhaust gas to generate ammonia. It is known that generated ammonia reacts with $NO_x$ in the exhaust gas in the $NO_x$ reduction catalytic converter 20 to be purified into water and harmless gas. At this time, in order to improve the $NO_x$ purification efficiency in the $NO_x$ reduction catalytic converter 20, NO is oxidized into $NO_2$ by the oxidation catalytic converter 16, so that a rate between NO in the exhaust gas and $NO_2$ therein is improved to be suitable for the catalytic-reduction reaction. Further, ammonia passed through the $NO_x$ reduction catalytic converter 20 is oxidized by the ammonia oxidation catalytic converter 22 disposed on the exhaust downstream of the $NO_x$ reduction catalytic converter 20, and therefore, it is possible to prevent ammonia of bad odor from being discharged into the atmosphere just as it is.

Figure 2:
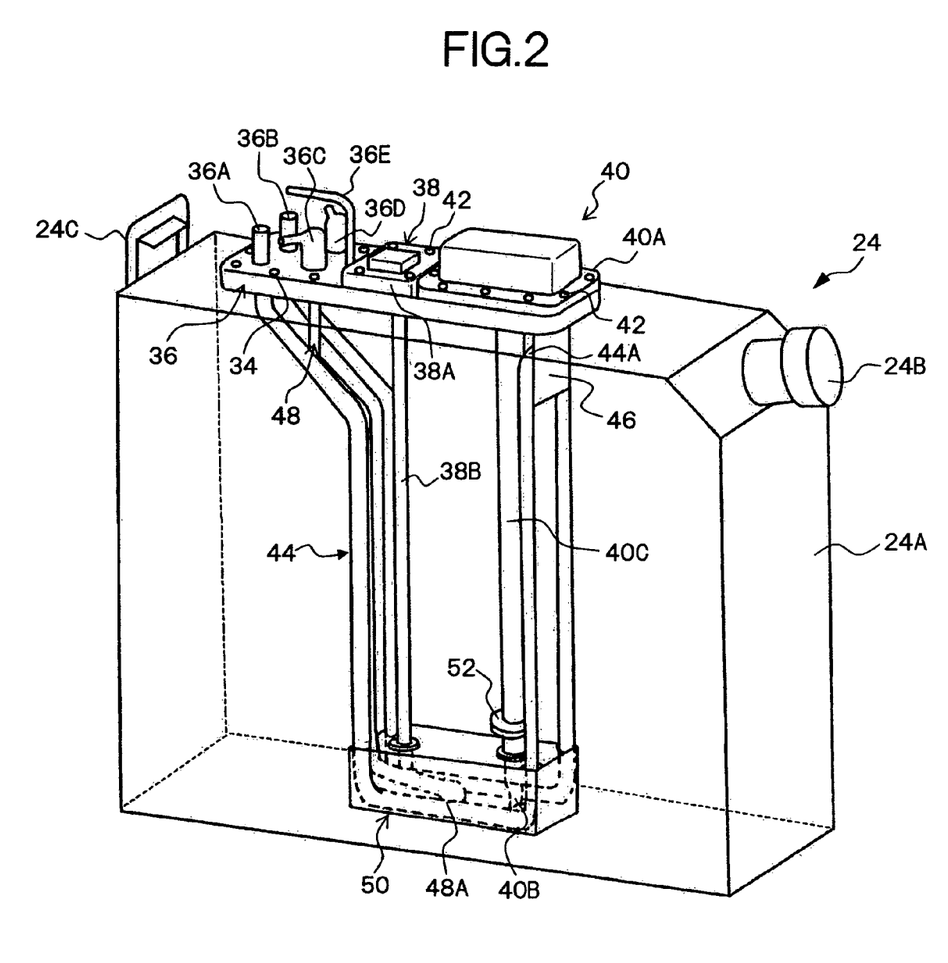
FIG. 2 is a perspective view showing a reducing agent container and an internal arrangement thereof.

In the reducing agent container 24, as shown in FIG. 2, on upper side face portions forming bifacial widths in a longitudinal direction of a container body 24A in substantially rectangular solid shape, there are disposed respectively a replenishment port 24B for replenishing the urea aqueous solution and a handle 24C which is to be held when carrying the reducing agent container 24. Further, on an upper surface of the container body 24A, an opening portion (not shown in the figure) is formed, and a top lid 36 is detachably fastened by means of a plurality of bolts 34 so as to cover the opening portion.

On an upper surface of the top lid 36, from one end portion to a center portion in a longitudinal direction thereof, there are formed respectively an inlet port 36A and an outlet port 36B for the engine coolant as a heating medium using the engine as a heat source thereof, a supply port 36C and a return port 36D for the urea aqueous solution, and an opening port 36E for opening the internal upper space of the reducing agent container 24 to the atmosphere so as to prevent a pressure in the internal upper space from becoming negative. Further, on the top lid 36, from the center portion to the other end portion in the longitudinal direction thereof, a base portion 38A of a water gauge 38 which detects a residual amount of the urea aqueous solution and a base portion 40A of a concentration meter 40 which detects the concentration of the urea aqueous solution, are detachably fastened respectively by means of screw bolts 42. The water gauge 38 is provided with an inner electrode and an outer electrode arranged in concentric, both of which have circular cross sections, to detect the level of the urea aqueous solution based on a change in electrostatic capacity between both electrodes, and a detecting section 38B comprised of the inner electrode and the outer electrode suspended from the base portion 38A toward the bottom portion of the container body 24A. On the other hand, the concentration meter 40 is for detecting the concentration of the urea aqueous solution based on a temperature transfer characteristic between two spaced points, and a detecting section 40B thereof is suspended from the base portion 40A via a supporting column 40C so that the detecting section 40B is positioned on the bottom portion of the container body 24A.

Figure 3:
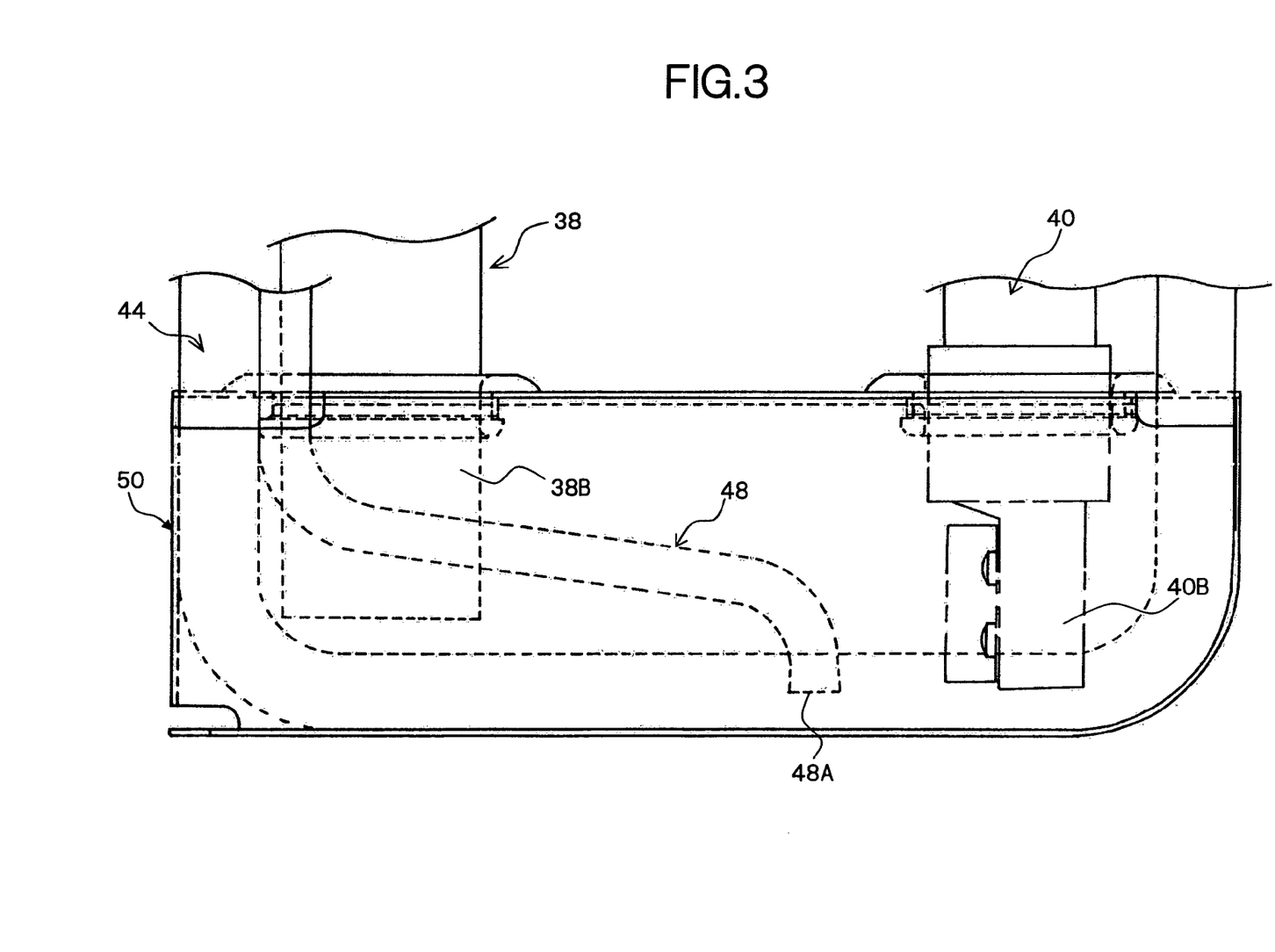
FIG. 3 is a front view of a protector fixed to a lower portion of a heat exchanger.
Figure 4:
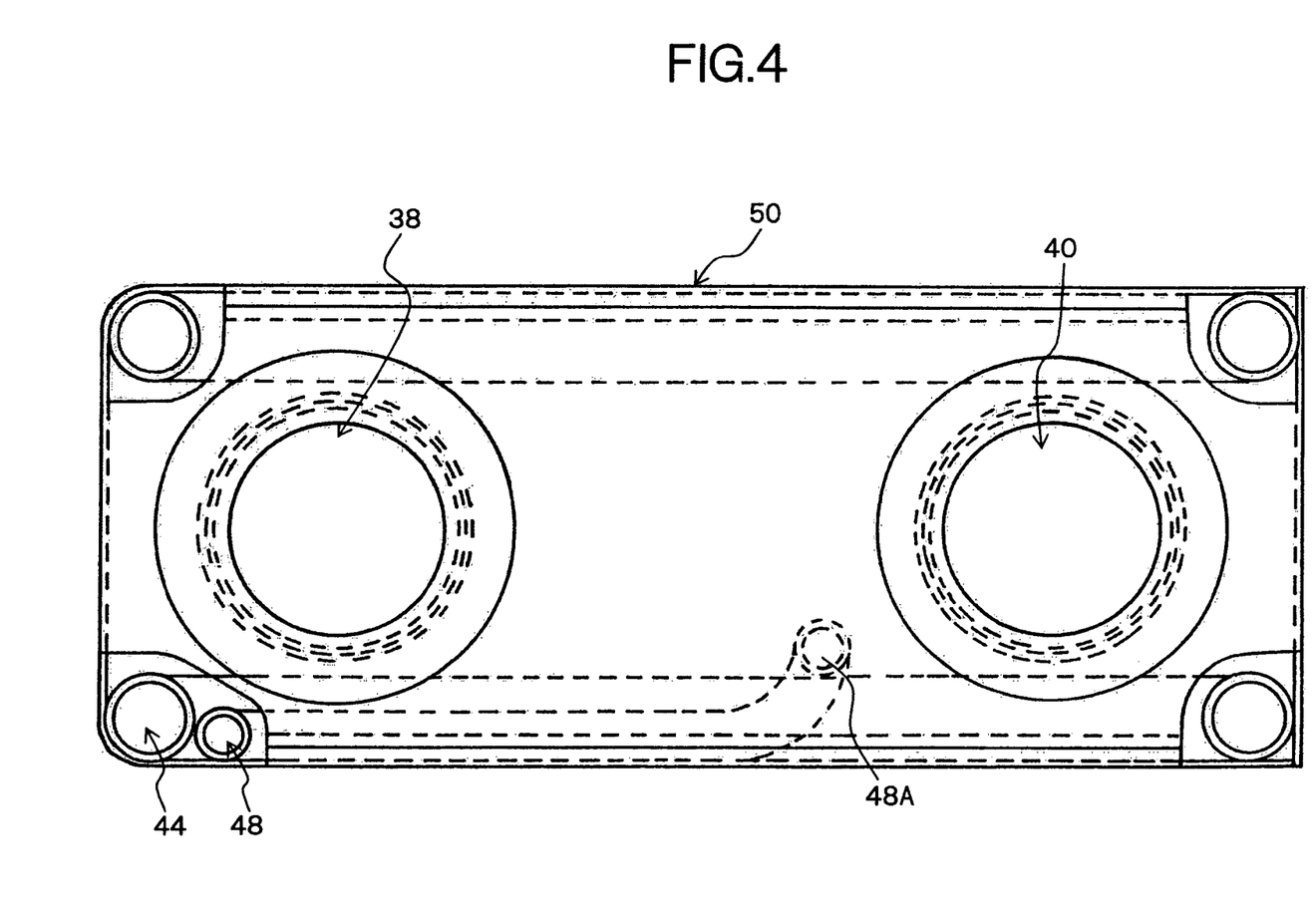
FIG. 4 is a plan view of the protector fixed to the lower portion of the heat exchanger.

The inlet port 36A and the outlet port 36B for the engine coolant are fluidly interconnected via a heat exchanger 44 disposed in the container body 24A. As shown in FIG. 3 and FIG. 4, the heat exchanger 44 is structured such that a pipe material of substantially U-shaped is bent so as to surround the water gauge 38 and the concentration meter 40 on the bottom portion of the container body 24A, and also, a tip bent portion 44A thereof is supported by a bracket 46 fixed to the top lid 36. Thus, if the heat exchanger 44 is configured by bending the substantially U-shaped pipe material, the total length of the heat exchanger 44 in the reducing agent container is increased, so that the heat exchange with the urea aqueous solution can be efficiently performed. On the other hand, since the tip bent portion 44A is supported by the bracket 46 fixed to the top lid 36, the heat exchanger 44 is supportively fixed to the top lid 36 at three points so that the mounting rigidity of the heat exchanger 44 can be enhanced.

Further, to the supply port 36C for the urea aqueous solution, a suction pipe 48 configured to suck the urea aqueous solution from the bottom portion of the container body 24A between the water gauge 38 and the concentration meter 40 is connected. The suction pipe 48 is welded or brazed to the pipe material of the heat exchanger 44, which extends from the inlet port 36A for the engine coolant toward the bottom portion of the container body 24A, while a part of the suction pipe 48 running along the pipe material, and also, a portion from an intermediate portion to a front portion of the suction pipe 48 arranged to be bent so that a suction port 48A formed on a tip end portion of the suction pipe 48 is opened downwardly between the water gauge 38 and the concentration meter 40.

Furthermore, on a lower portion of the heat exchanger 44, there is disposed a protector 50 as an encasing member of substantially box shape, in order to protect the water gauge 38 and the concentration meter 40 from ice gorges of the urea aqueous solution frozen in the reducing agent container 24, and also, in order to surround the water gauge 38, the concentration meter 40 and the suction pipe 48, which are positioned on the lower portion of the heat exchanger 44, to thereby trap the heat discharged from the heat exchanger 44.

Since the water gauge 38 and the concentration meter 40 need the periodic inspection and maintenance, it is impossible to couple the water gauge 38 and the concentration meter 40 with the protector 50 without any space. Therefore, since a space exists between the water gauge 38 and the concentration meter 40, and the protector 50, there is a possibility that, when the urea aqueous solution is replenished, bubbles may enter the inside of the protector 50 through the space and then the bubbles may adhere to the detecting section 40B of the concentration meter 40.

Figure 5:
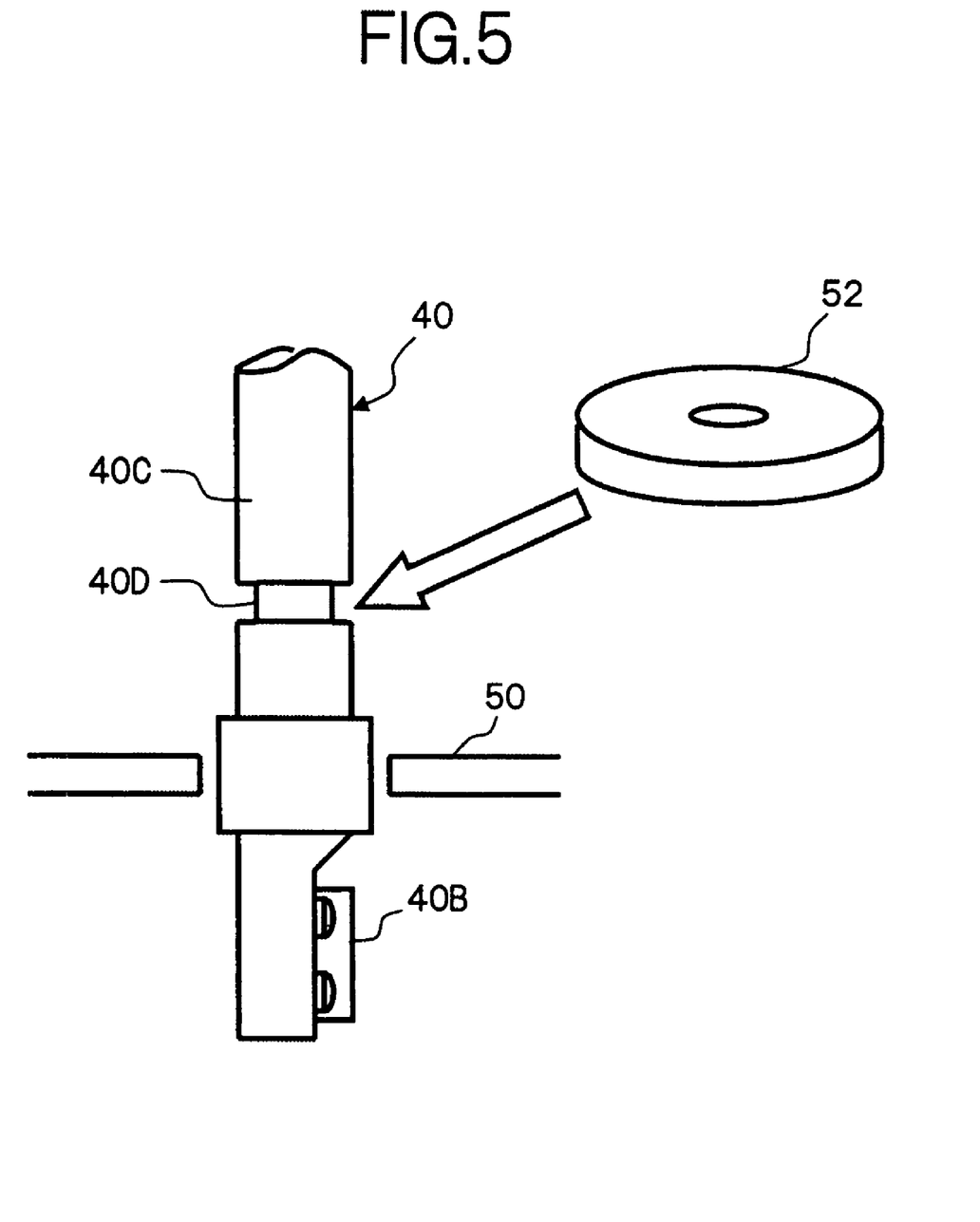
FIG. 5 is an explanatory diagrammatic view of an attachment structure of a visor on a supporting column of a concentration meter.
Figure 6:
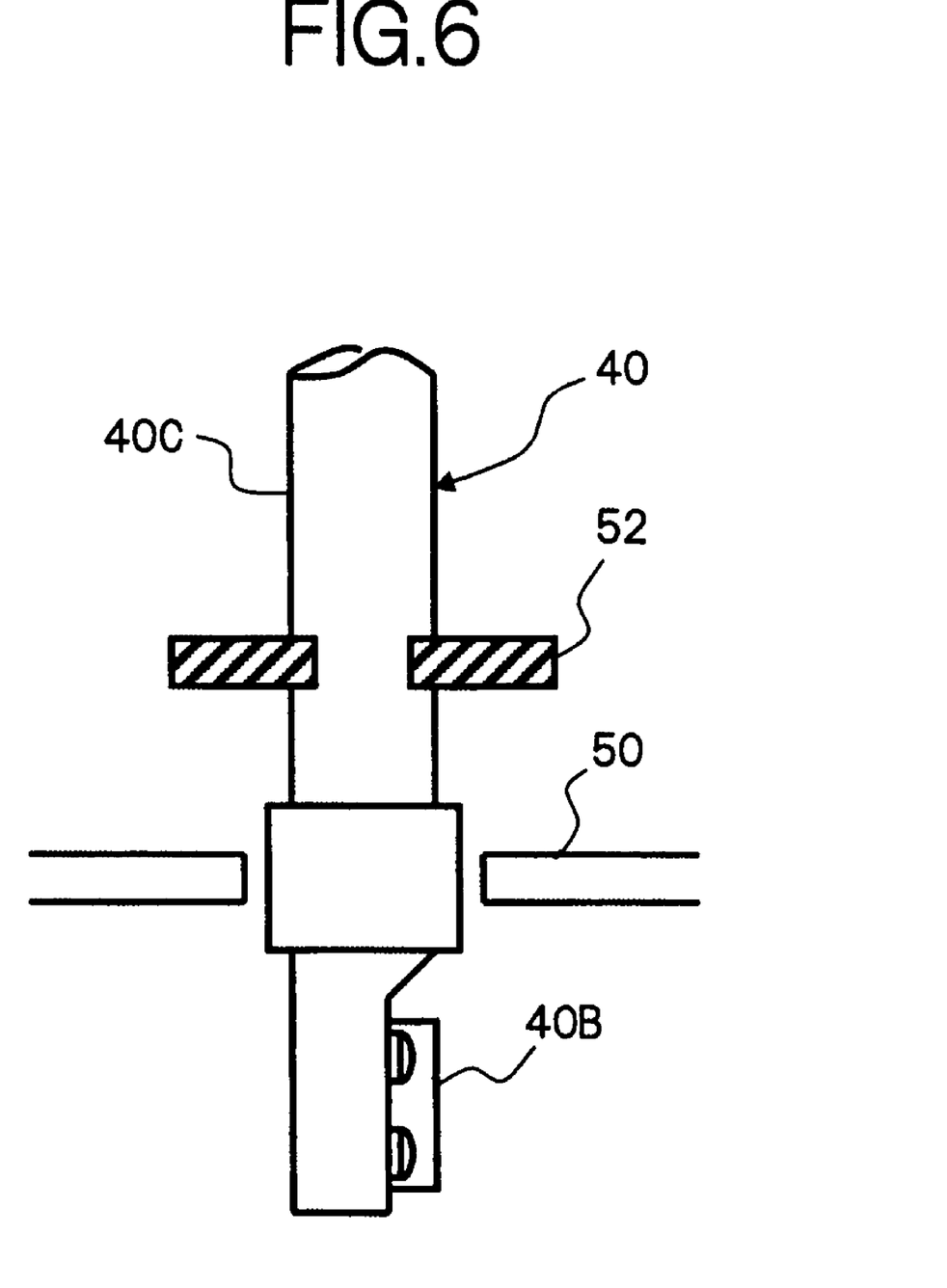
FIG. 6 is an explanatory diagrammatic view of the visor according to a first embodiment.
Figure 7:
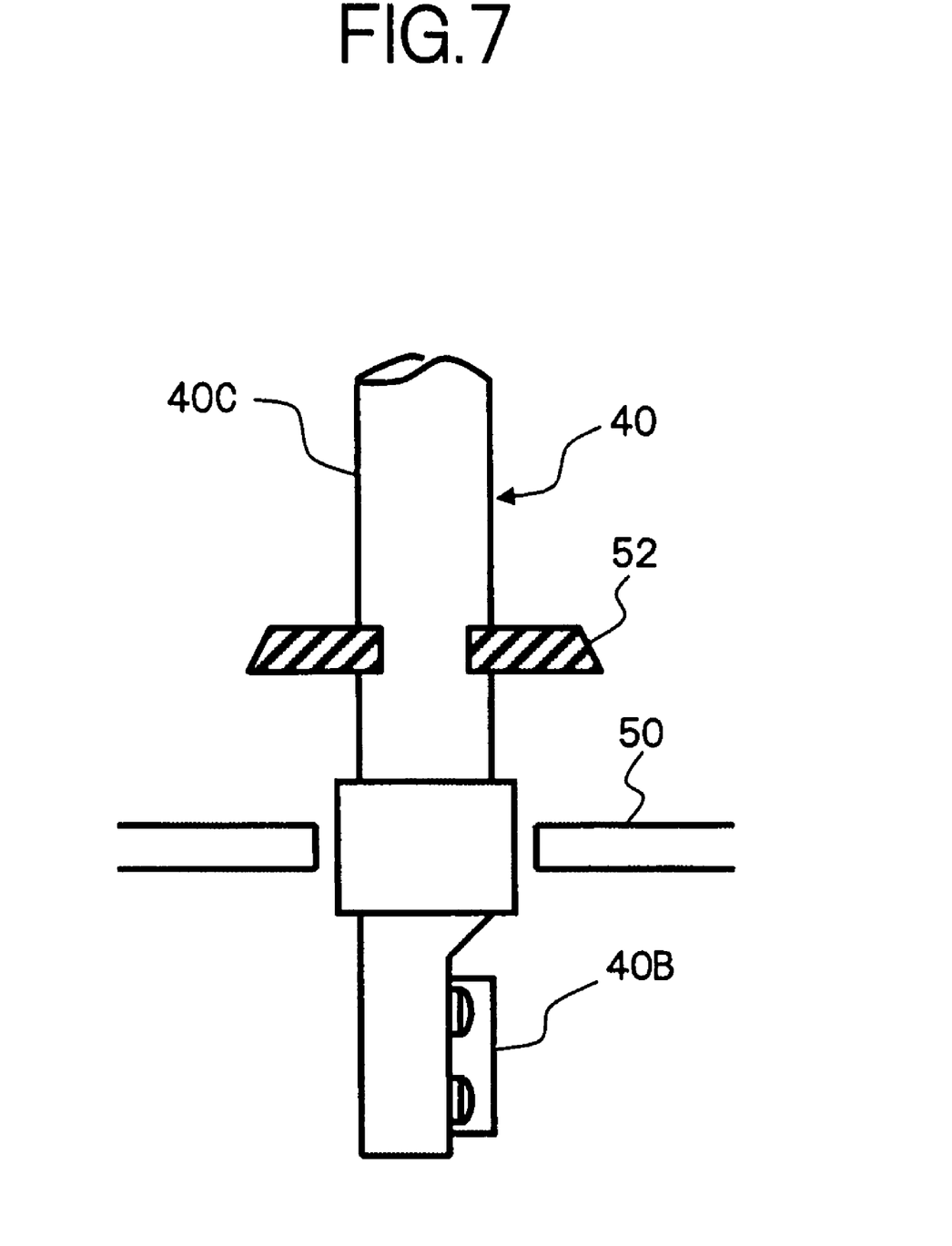
FIG. 7 is an explanatory diagrammatic view of the visor according to a second embodiment.

Consequently, as shown in FIG. 5, a peripheral groove 40D is formed to be recessed in the supporting column 40C of the concentration meter 40, which is arranged at a position located above and spaced apart from the protector 50 by a predetermined interval, and a visor 52 formed of an elastic material, such as rubber or the like, is fitted in the peripheral groove 40D. The visor 52 is in a cylindrical shape as shown in FIG. 6 or in a truncated cone shape as shown in FIG. 7 and, a cross section thereof lying in a plane perpendicular to an axis of the supporting column may be in a circular shape, a rectangular shape or the like.

Next, there will be described an operation of the reducing agent container 24 having the above configuration.

When an operation of the engine 10 is stopped for a long time in a state where the outside temperature is equal to or lower than a freezing point of the urea aqueous solution, the heat is drawn from an outer periphery of the reducing agent container 24 by the outside air, and the urea aqueous solution begins to be frozen from a peripheral portion in the container and the freezing thereof gradually progresses toward a container center portion. In this state, when the operation of the engine 10 is started, the engine coolant of which temperature rises with time, starts to be circulated in the heat exchanger 44. Then, when the temperature of the engine coolant becomes higher than the freezing point of the urea aqueous solution, the urea aqueous solution frozen in the reducing agent container 24 begins to be gradually defrosted.

At this time, the heat discharged from the lower portion of the heat exchanger 44 is trapped in an interior region encased by the protector 50, to generate the convection within the interior region of the protector 50. Consequently, the defrosting of the urea aqueous solution around the water gauge 38, the concentration meter 40 and the suction pipe 48, which are positioned inside the protector 50, is promoted, so that a function of the exhaust emission purifying apparatus can be bring out in a short time after the engine operation is started. Then, the urea aqueous solution staying above the protector 50 is defrosted by the heat exchanger 44 in an substantially ring shape centered around and along the pipe material in a short time, and therefore, the inside of the protector 50 is fluidly communicated with the upper space of the reducing agent container 24. As a result, it is able to avoid an inner pressure of the protector 50 being negative due to the suction of the urea aqueous solution, so that it is easy to suck the urea aqueous solution.

Figure 8:
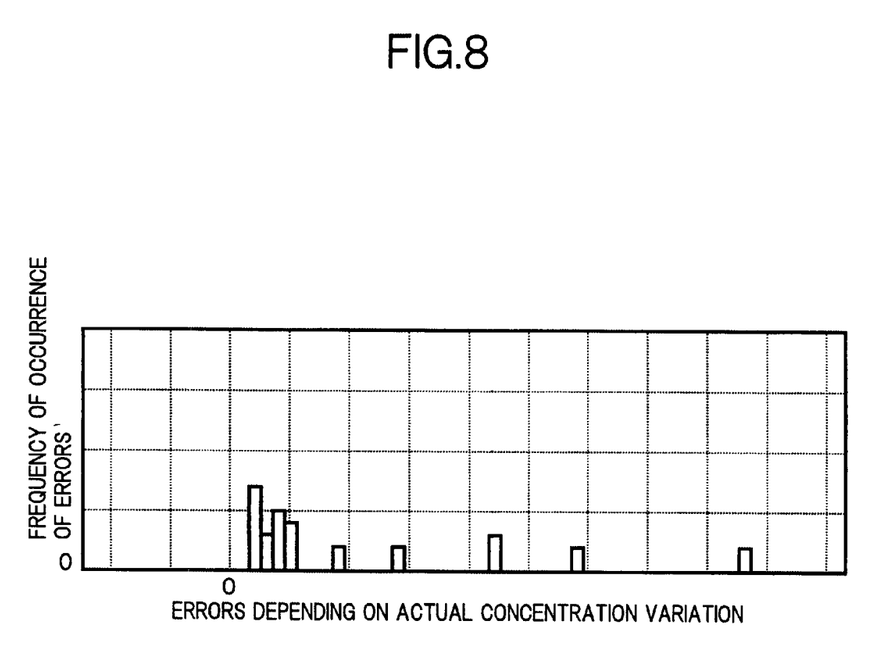
FIG. 8 is an explanatory diagrammatic view showing an error to the actual concentration, which occurs when the urea aqueous solution is replenished in a state where no visor is provided.
Figure 9:
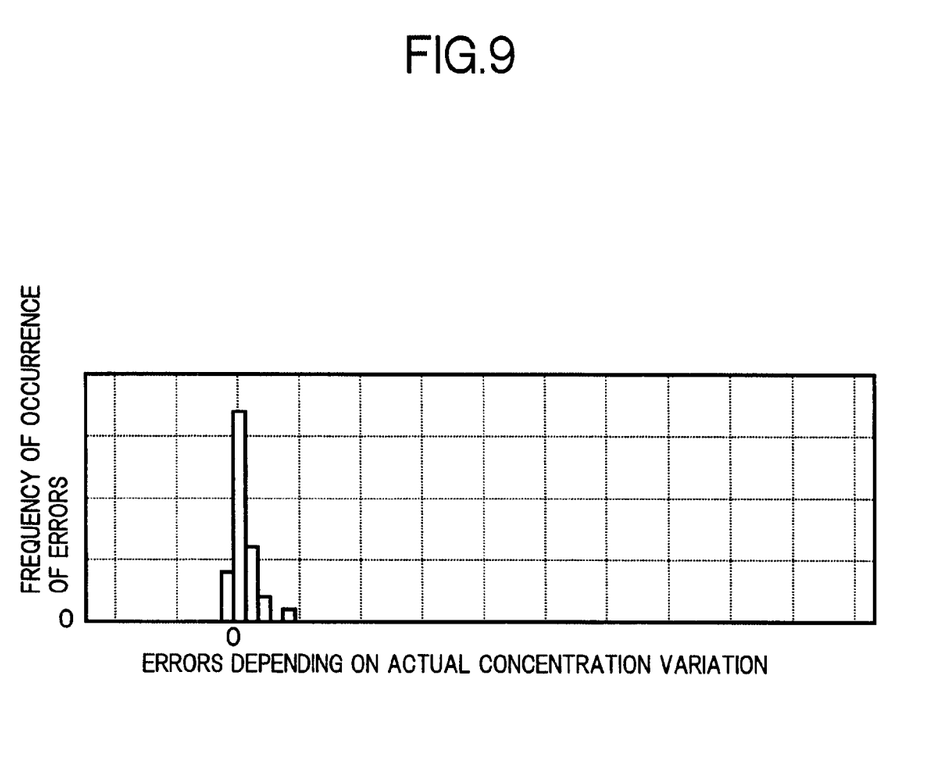
FIG. 9 is an explanatory diagrammatic view showing an error to the actual concentration, which occurs when the urea aqueous solution is replenished in a state where the visor is provided.

Further, upon replenishment of the urea aqueous solution into the reducing agent container 24, the urea aqueous solution is swashed by the visor 52 attached on the supporting column 40C of the concentration meter 40, toward the circumference of the visor 52. Accordingly, it becomes hard or very rare for the urea aqueous solution to directly pass through the space between the supporting column 40C and the protector 50 to enter the inside of the protector 50 upon the replenishment. Consequently, it is also very rare for bubbles entered the inside of the protector 50 together with the urea aqueous solution to adhere to the detecting section 40B of the concentration meter 40. Therefore, it is possible to suppress the degradation of the concentration detection accuracy depending on a change in the heat transmission characteristic between the two spaced points. Here, FIG. 8 and FIG. 9 show errors to the actual concentrations, which occurred upon the replenishment of the urea aqueous solution, the measurements being executed for 30 times. As shown in FIG. 8, when no visor was provided, such errors were observed over a wide range. However, as shown in FIG. 9, when a visor was provided, such errors were converged within a narrower range than that shown in FIG. 8.

Consequently, it is able to significantly reduce a state where bubbles remain adhering to the detecting section 40B of the concentration meter 40 after the urea aqueous solution is replenished. Therefore, it is possible to effectively suppress undesirable detection, for example, the concentration is detected to be rather lower than actual or the reducing agent container 24 is determined to be empty, although a sufficient amount of the urea aqueous solution at predetermined concentration is in the reducing agent container 24.

At this time, the visor 52 is fittingly fixed to the peripheral groove 40D formed on the supporting column 40C of the concentration meter 40. Therefore, the visor 52 never be undesirably shifted in an axial direction even if the urea aqueous solution collides against the visor 52, thereby enabling the improvement of mounting rigidity of the visor 52. Further, the visor 52 is formed of the elastic material, and therefore, is deformed unevenly by the collision with the urea aqueous solution, so that swash directions of the urea aqueous solution can be made uneven. Consequently, since an amount of the urea aqueous solution entering the inside of the protector 50 via the space between the supporting column 40C of the concentration meter 40 and the protector 50, is further decreased, it is possible to further suppress bubbles to adhere to the detecting section 40B of the concentration meter 40.

Incidentally, the visor 52 may be attached not only on the supporting column 40C of the concentration meter 40 but also on the water gauge 38 above the protector 50 by a predetermined interval. Thus, bubbles passes through the space between the detecting section 38B of the water gauge 38 and the protector 50 to enter the inside of the protector 50, is further decreased, and therefore, it is possible to further suppress bubbles to go around the detecting section 40B of the concentration meter 40 to thereby adhere thereto.

As recognized by a person skilled in the art, the present invention can be applied not only to the exhaust emission purifying apparatus using the urea aqueous solution as the liquid reducing agent, but also to those apparatuses using, as a liquid reducing agent, the ammonia aqueous solution, and gasoline, diesel oil, alcohol and the like including hydrocarbon as main component thereof.

It should be appreciated that the entire contents of Japanese Patent Application No. 2004-315574, filed on Oct. 29, 2004, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

We claim:

1. A reducing agent container, comprising:
    a body;
    a concentration meter, configured to detect a concentration of a liquid reducing agent based on a heat transmission characteristic between two spaced points, including a base portion being attached on an upper surface of the body;
    a heat exchanger configured to allow a heating medium using an engine as a heat source thereof to circulate therein and arranged to surround a detecting section of the concentration meter which is suspended from the base portion of the concentration meter via a supporting column thereof, to thereby perform the heat exchange with the liquid reducing agent, the heat exchanger being attached on the upper surface of the body;
    an encasing member of substantially box shape, having six faces and an interior region, which is arranged to surround a lower portion of the heat exchanger and the detecting section of the concentration meter; and
    a visor arranged to be attached on the supporting column of the concentration meter, at a position located above and spaced apart from the encasing member by a predetermined interval,
    wherein the concentration meter and the encasing member are separated by a space, and
    wherein the supporting column penetrates an upper surface of the encasing member and extends into the interior region of the encasing member.

2. The reducing agent container, according to claim 1, wherein the visor is fittingly fixed to a peripheral groove formed on the supporting column of the concentration meter.

3. The reducing agent container, according to claim 1, wherein the visor is formed of an elastic material.

4. The reducing agent container, according to claim 1, wherein the visor is formed in a cylindrical shape or in a truncated cone shape.

5. The reducing agent container, according to claim 1, wherein the visor has a cross section thereof in a circular shape or a rectangular shape.

6. The reducing agent container, according to claim 1, wherein the heat exchanger is formed by bending a pipe material of substantially U-shaped, which fluidly interconnects an inlet port with an outlet port of the heating medium.

* * * * *